April 22, 1947.  W. G. VASEY  2,419,303
FOLDING SPECTACLE FRAMES
Filed Sept. 25, 1944
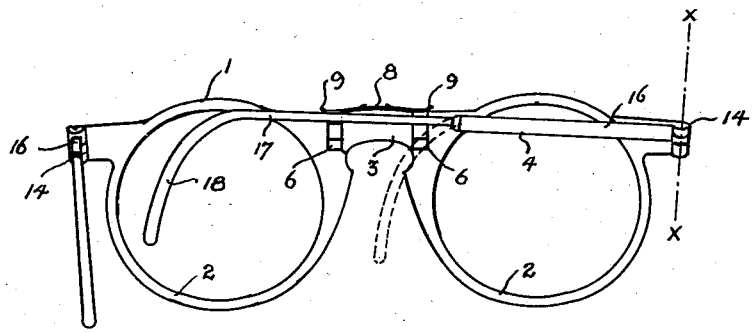
Fig.1.
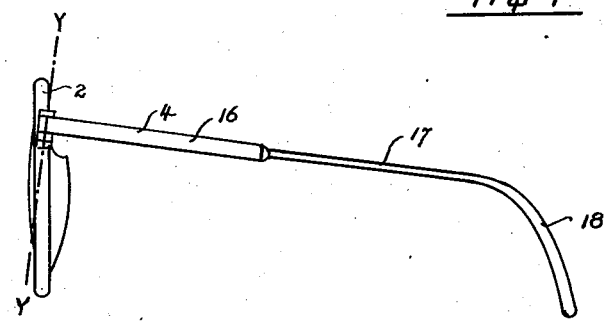
Fig.2.
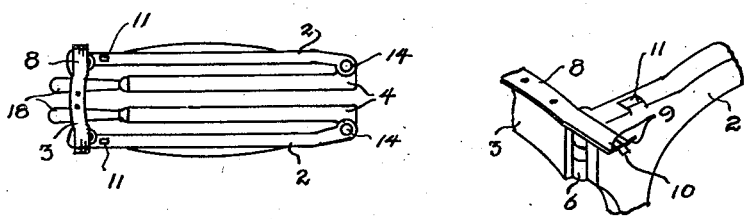 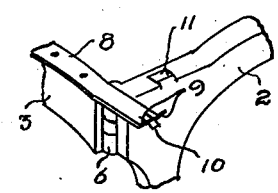
Fig.3.  Fig.4.
INVENTOR
WILLIAM GEORGE VASEY
Ernest E Carver
ATTORNEY.

UNITED STATES PATENT OFFICE 2,419,303

FOLDING SPECTACLE FRAME

William George Vasey, New Westminster,
British Columbia, Canada

Application September 25, 1944, Serial No. 555,634

1 Claim. (Cl. 88—44)

My invention relates to improvements in folding spectacle frames, the objects of which are to provide a pair of spectacles capable of being folded into compact form so that they may be more conveniently carried in a small pocket case than the conventional type of frame.

The objects of the invention are to provide a spectacle frame which can be folded at the bridge to reduce the case area to slightly more than the rectangular area of one of the eyepieces and to provide that when in use the hinges at the bridge shall remain in fixed position so that the plane of the lenses will be supported in a position vertical to the line of vision.

Other objects will appear as the specification proceeds.

Referring to the drawings:

Fig. 1 is an elevational view of the invention showing one temple extended at a right angle to the spectacle frame and the other folded parallel thereto.

Fig. 2 is a side elevational view.

Fig. 3 is a plan view, showing the spectacles fully folded.

Fig. 4 is an enlarged detail view showing the bridge hinge locking means.

In the drawings like characters of reference indicate corresponding parts in each figure.

The numeral 1 indicates generally a spectacle frame having eyepieces 2, a bridge 3 and temples 4. The eyepieces 2 are connected to the bridge with hinges 6 which are adapted to swing 90 degrees from a position in which the eyepieces are in alignment with each other to a position as shown in Figure 3 where the eyepieces are parallel to each other.

Secured lengthwise of the top of the bridge 3 is a leaf spring 8 having upturned free ends 9 from each of which a downwardly projecting tongue 10 is formed, see detail in Figure 4. Along the top edge of each eyepiece 2 and adjacent the bridge 3 is an indent 11 into which the tongue 10 drops as the eyepieces are brought into alignment to hold the components 2 and 3 in rigid aligned position.

At the outer end of each eyepiece 2, a hinge 14 is formed to which the temple is secured, the axis of each of these being inclined away from the bridge 3 as indicated at X—X in Figure 1, to cause the free or curved end of the temple to be elevated and lie substantially within the perimeter of an eyepiece when said temple is folded into close proximity to said eyepiece and being inclined rearwardly as at Y—Y in Figure 2, to cause the temple to extend downwardly so that when said temple rests upon the ear of the user the eyepieces are vertical to the user's normal line of vision.

The temples 4 are each formed with a tubular member 16 in which an extension 17 curved downwardly at its free end as at 18 is telescopically mounted.

In use if it is desired to enclose the spectacles in a long case, the temples are folded into proximity with the eyepieces in the usual way, thus bringing all the component parts within the depth of the eyepieces 2 as in Figure 1.

To fold the spectacles to compact form as shown in Figure 3, the straight portions of the extensions 17 are telescoped into the tubular members 16, the temples are then folded in the usual way, the upturned ends 9 of the spring 8 are raised to disengage the tongues 10 from the indents 11, and the eyepieces 2 are folded into parallelism as shown in Figure 3. When in this position all the parts of the spectacle may be encompassed by a rectangle of the outside dimensions of one of its eyepieces and be enclosed in a container of the size of an eyepiece and having a depth equal to the length of the bridge and its spring 8.

What I claim as my invention is:

A spectacle comprising a pair of eyepieces, a bridge, a hinge connecting each eyepiece to the bridge, a spring secured lengthwise of the bridge and extending therebeyond to engage the eyepieces, each extremity of the spring being upturned and provided with a downwardly projecting tongue, each of said eyepieces having an indent adapted to receive a tongue of the spring, the upturned end portions of said spring being adapted to facilitate the lifting of said tongues from the indents of the eyepieces.

WILLIAM GEORGE VASEY.

REFERENCES CITED

The following references are of record in the file of this patent:

UNITED STATES PATENTS

| Number | Name | Date |
|---|---|---|
| 2,117,385 | Wells | May 17, 1938 |
| 325,014 | Rodes | Aug. 25, 1885 |
| 244,686 | Terstegen | July 19, 1881 |
| 1,576,872 | Jeaneret | Mar. 16, 1926 |